(12) United States Patent
Pinsenschaum et al.

(10) Patent No.: US 6,733,032 B2
(45) Date of Patent: May 11, 2004

(54) AIR BAG COVER ASSEMBLY (75) Inventors: Ryan Todd Pinsenschaum, Vandalia, OH (US); Patrick W. Schatz, Lebanon, OH (US)

(73) Assignee: Delphi Technologies, Inc., Troy, MI (US)

( * ) Notice: Subject to any disclaimer, the term of this patent is extended or adjusted under 35 U.S.C. 154(b) by 132 days.

(21) Appl. No.: 10/072,420

(22) Filed: Feb. 5, 2002

(65) Prior Publication Data

US 2002/0125689 A1 Sep. 12, 2002

Related U.S. Application Data (60) Provisional application No. 60/275,015, filed on Mar. 12, 2001.

(51) Int. Cl.⁷ ............................................... B60R 21/20
(52) U.S. Cl. ..................................... 280/728.3; 280/732
(58) Field of Search ............................ 280/728.3, 732, 280/728.1, 731; B60R 21/20

(56) References Cited

U.S. PATENT DOCUMENTS

| 4,836,576 A | | 6/1989 | Werner et al. | |
|---|---|---|---|---|
| 5,069,477 A | | 12/1991 | Shiraki | |
| 5,183,289 A | | 2/1993 | Zeller et al. | |
| 5,238,264 A | * | 8/1993 | Barnes | 280/732 |
| 5,320,381 A | * | 6/1994 | Barnes et al. | 280/728.3 |
| 5,368,327 A | * | 11/1994 | Shiraki et al. | 280/728.2 |
| 5,382,047 A | | 1/1995 | Gajewski | |
| 5,423,571 A | * | 6/1995 | Hawthorn | 280/738 |
| 5,533,746 A | * | 7/1996 | Whited | 280/728.2 |
| 5,564,733 A | | 10/1996 | Duenas et al. | |
| 5,569,959 A | * | 10/1996 | Cooper et al. | 280/728.3 |
| 5,590,901 A | | 1/1997 | MacGregor | |
| 5,941,558 A | * | 8/1999 | Labrie et al. | 280/728.3 |
| 6,053,527 A | * | 4/2000 | Gans et al. | 280/728.3 |
| 6,247,722 B1 | | 6/2001 | Brodi et al. | |
| 6,390,497 B1 | * | 5/2002 | Shin | 280/728.3 |
| 6,422,591 B1 | * | 7/2002 | Cuevas et al. | 280/728.3 |
| 6,460,876 B1 | * | 10/2002 | Nishijima | 280/728.3 |
| 6,502,852 B2 | * | 1/2003 | Kassman et al. | 280/728.3 |
| 6,533,314 B2 | | 3/2003 | Merrifield et al. | |

* cited by examiner

*Primary Examiner*—Ruth Ilan
(74) *Attorney, Agent, or Firm*—Scott A. McBain (57) ABSTRACT

An air bag cover assembly for disposition within an automotive vehicle dash panel in overlying relation to an inflatable air bag cushion. The cover assembly includes a door structure having a displaceable interior portion. Upon application of force from the inflatable air bag cushion, the interior portion is displaceable in a hinging manner relative to dash panel and undergoes internal deformation to facilitate desired deployment characteristics for a given configuration.

25 Claims, 9 Drawing Sheets

PRIOR ART

AIR BAG COVER ASSEMBLY

CROSS-REFERENCE TO RELATED APPLICATION

This application claims priority from U.S. Provisional Application No. 60/275,015 having a filing date of Mar. 12, 2001 the contents of which are incorporated herein by reference.

TECHNICAL FIELD

This invention relates to an air bag cover assembly for use in an automobile in overlying relation to an inflatable air bag cushion. More particularly, the invention relates to an air bag door construction including an arrangement of integral hinge elements which are arranged so as to produce a controlled deployment geometry in the air bag door upon inflation of the underlying air bag cushion.

BACKGROUND OF THE INVENTION

It is well known in motor vehicles to provide an air bag module which includes an inflatable air bag cushion for the protection of a vehicle occupant in the event of a collision. The air bag module typically includes an inflator for discharging an inflation medium such as high pressure gas or the like into the air bag cushion upon the occurrence of a predetermined level of vehicle deceleration or other measurable vehicle condition.

Inflatable air bag cushions may be located at a number of locations within the vehicle so as to provide protection for the occupants therein during various collision events. In particular, it is known to utilize an inflatable air bag cushion deployable from the dash panel of a vehicle in substantially opposing relation to a passenger within the vehicle during the collision event. In order to facilitate the deployment of the inflatable air bag cushion from the dash panel, the dash panel is typically provided with an opening therein which is covered by a displaceable cover assembly. Such cover assemblies typically incorporate a substrate material such as metal or plastic which may be covered with a foam and/or a decorative skin layer so as to provide a substantially continuous surface across the dash panel. One such cover assembly is illustrated and described in U.S. Pat. No. 5,382,047 to Gajewski the teachings of which are incorporated by reference as if fully set forth herein.

In order to facilitate the deployment of the inflatable air bag cushion from beneath the dash panel, it is known to incorporate a weakened break-out pattern across the substrate to define a hinging door within the cover assembly which is displaceable upon the application of force from the underlying air bag cushion as the cushion expands outwardly.

Upon displacement, the door assembly which is made up of a portion of the substrate and covering materials opens in a hinging manner so as to swing upwardly. During this hinging movement, the door structure typically retains its shape characteristics such that the edge closest to the occupant swings upwardly and away from surrounding portions of the dash panel in a well defined arc.

The fixed arc displacement of the door panel has been found to provide adequate deployment characteristics for the underlying air bag. However, the space requirements associated with the movement of the substantially rigid door may affect the freedom of design of the instrument panel and may also have an impact on the freedom of an occupant to be positioned in extremely close proximity to the door structure due to the fact that adequate room must be maintained accommodate the swinging arc.

SUMMARY OF THE INVENTION

According to one aspect, the present invention provides advantages and alternatives over the prior art by providing an air bag cover assembly including a displaceable door structure which hinges away form the surrounding cover structure while at the same time undergoing internal deformation in a predefined manner so as to reduce space requirements for the hinging displacement.

According to another aspect, the present invention provides an air bag cover assembly including a displaceable door structure incorporating an arrangement of integral hinge elements disposed within the boundaries of the door structure inboard of the perimeter of the door structure so as to give rise to internal tuned deformation of the door structure as an underlying force is applied by an inflating air bag cushion.

According to one exemplary embodiment, an air bag cover assembly is provided including a substrate panel having an air bag deployment opening disposed therein. A displaceable door structure is disposed across the air bag deployment opening within the substrate panel. The door structure is defined by a break-out pattern extending along perimeter edges of the door structure such that upon the application of force to the door structure from an underlying air bag cushion the door structure may open in a substantially hinging manner. The door structure is provided with a pattern of integral hinge elements disposed inboard of it's perimeter which define living hinges so as to give rise to controlled deformation of the door structure during the hinging displacement.

Other advantages and aspects of the present invention will become apparent through reference to the following detailed description and/or through practice of the invention as described therein.

BRIEF DESCRIPTION OF THE DRAWINGS

The following drawings which are incorporated in and which constitute a part of this specification illustrate several exemplary embodiments of the present invention and, together with the general description given above and the detailed description set forth below, serve to explain the principles of the invention wherein.

While the invention has been illustrated and described above and will hereinafter be described in connection with certain potentially preferred embodiments and procedures, it is to be understood that in no event is the invention to be limited to such illustrated and described embodiments and procedures. On the contrary, it is intended that the present invention shall extend to all alternatives and modifications to the illustrated and described embodiments and procedures as may embrace the broad principles of this invention within the true spirit and scope thereof.

DESCRIPTION OF THE PREFERRED EMBODIMENT

Figure 1:
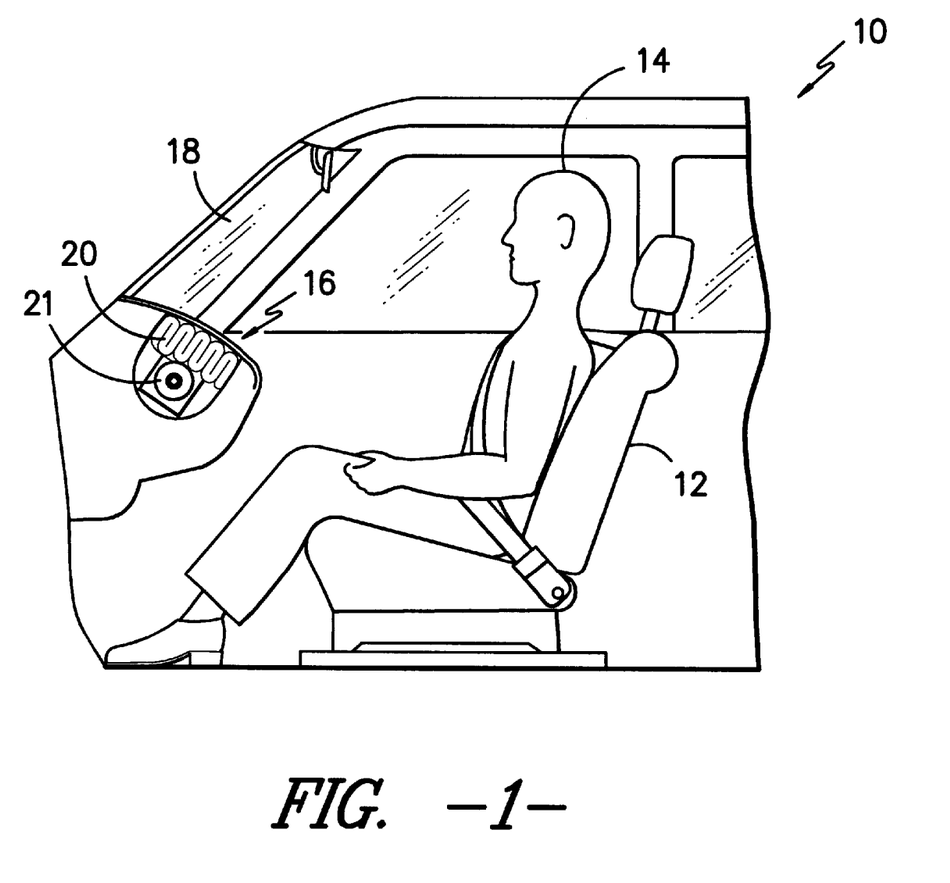
FIG. 1 is a cut-away side view of an automotive interior illustrating an air bag assembly within a dash panel structure.

Reference will now be made to the drawings, wherein to the extent possible like reference numerals are utilized to designate like components throughout the various views. In FIG. 1, it is seen that a vehicle 10 may include a seating structure 12 which supports an occupant 14 in generally opposing relation to a dash panel 16 extending below a windshield 18. An inflatable air bag cushion 20 is housed within the dash panel 16 in fluid communication with an inflator 21 for outward deployment through the surface of the dash panel 16 towards the occupant 14 upon the occurrence of deceleration exceeding a certain level or other measurable vehicle condition which warrants the deployment of the air bag cushion 20.

Figure 2:
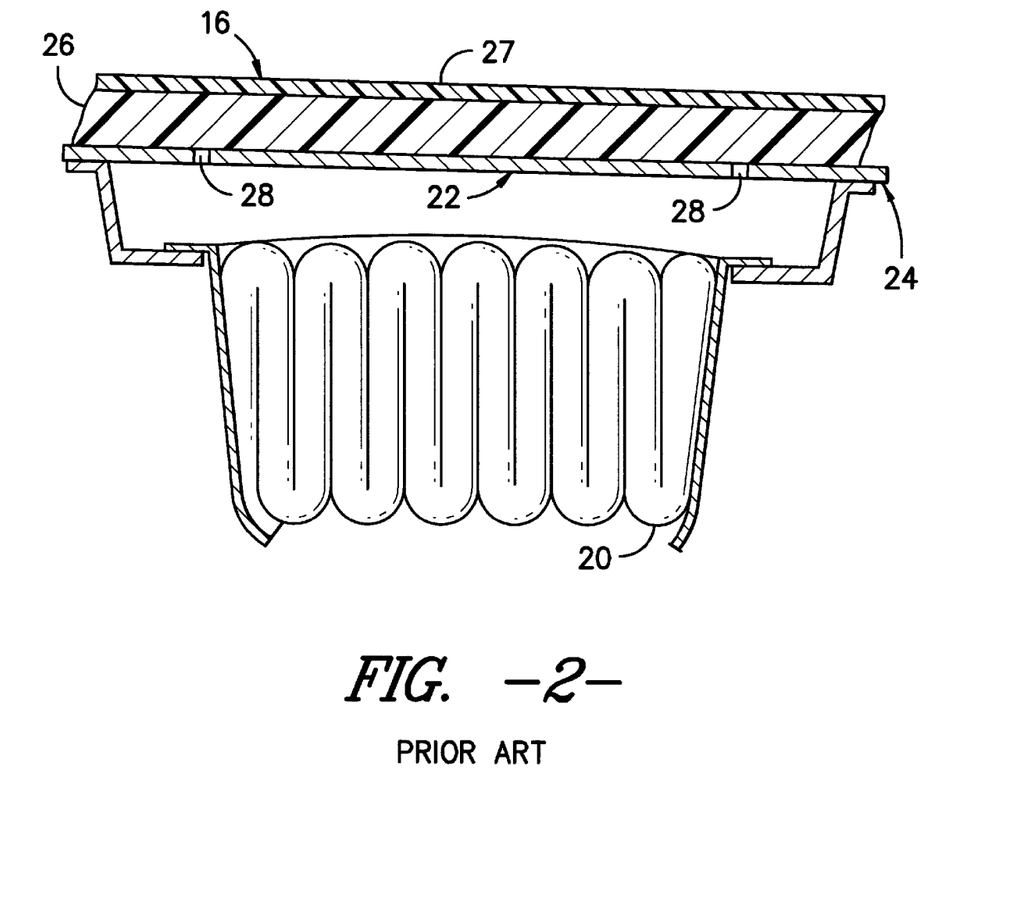
FIG. 2 is a cross-sectional view of an air bag assembly and overlying door structure according to the prior art.

In FIG. 2, there is illustrated an exemplary construction for the cover assembly overlying the air bag cushion 20 according to the prior art. In the illustrated prior art cover assembly, a door panel 22 of metal or plastic is disposed in covering relation to an opening within a supporting substrate 24. The outer surface of the substrate 24 and door panel 22 is covered by a layer of an elastomeric foam material such as polyurethane or the like that forms a cushion 26. A polymeric skin or shell 27 of vinyl or the like is disposed in covering relation to the cushion 26 so as to form an outer decorative surface of the dash panel 16.

As illustrated, the substrate 24 may include break-out locations 28 extending along selected portions of the door panel. In practice, the arrangement of the break-out locations 28 is such that a desired hinging action may be imparted to the door panel 22 and overlying materials upon the application of force by the underlying air bag cushion 20 as inflation gas is introduced into and throughout the air bag cushion 20.

Figure 3:
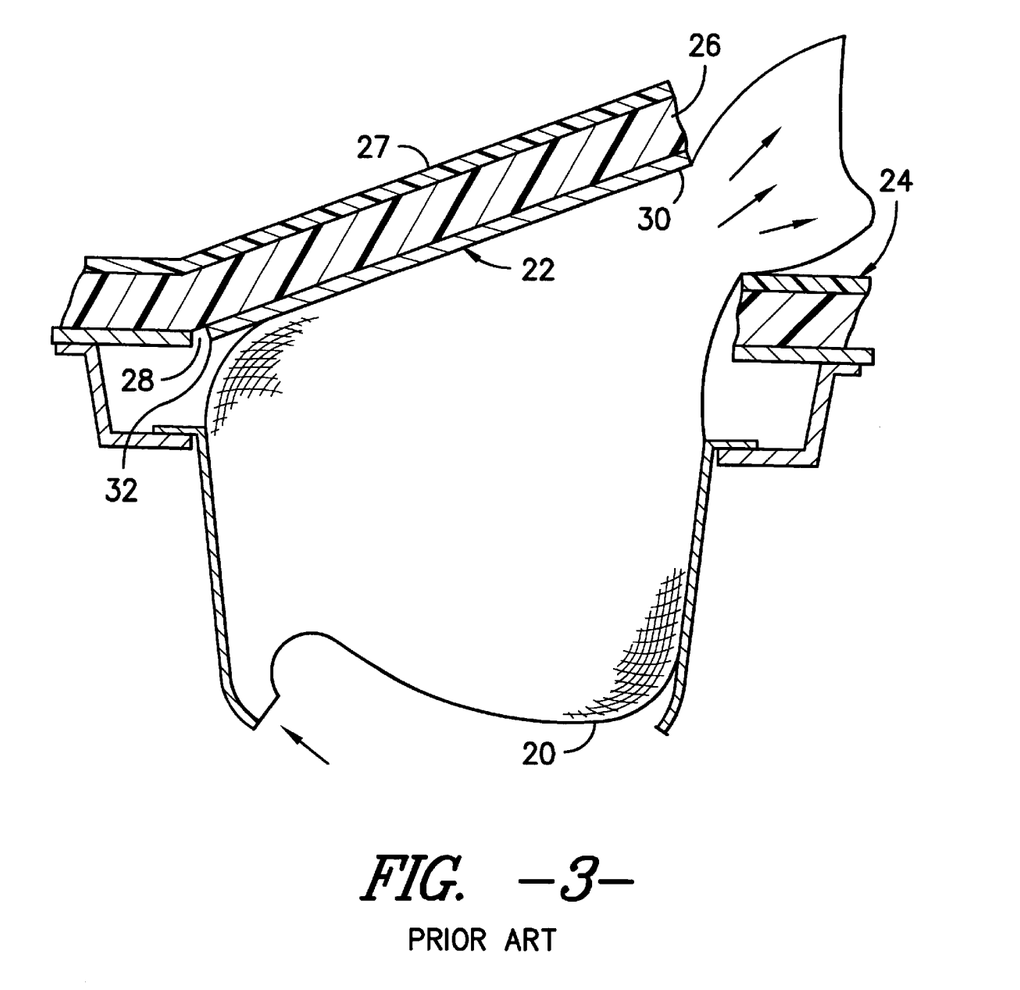
FIG. 3 is a view similar to FIG. 2 illustrating the hinging action of a prior art door structure upon deployment of an underlying air bag cushion.
Figure 6A:
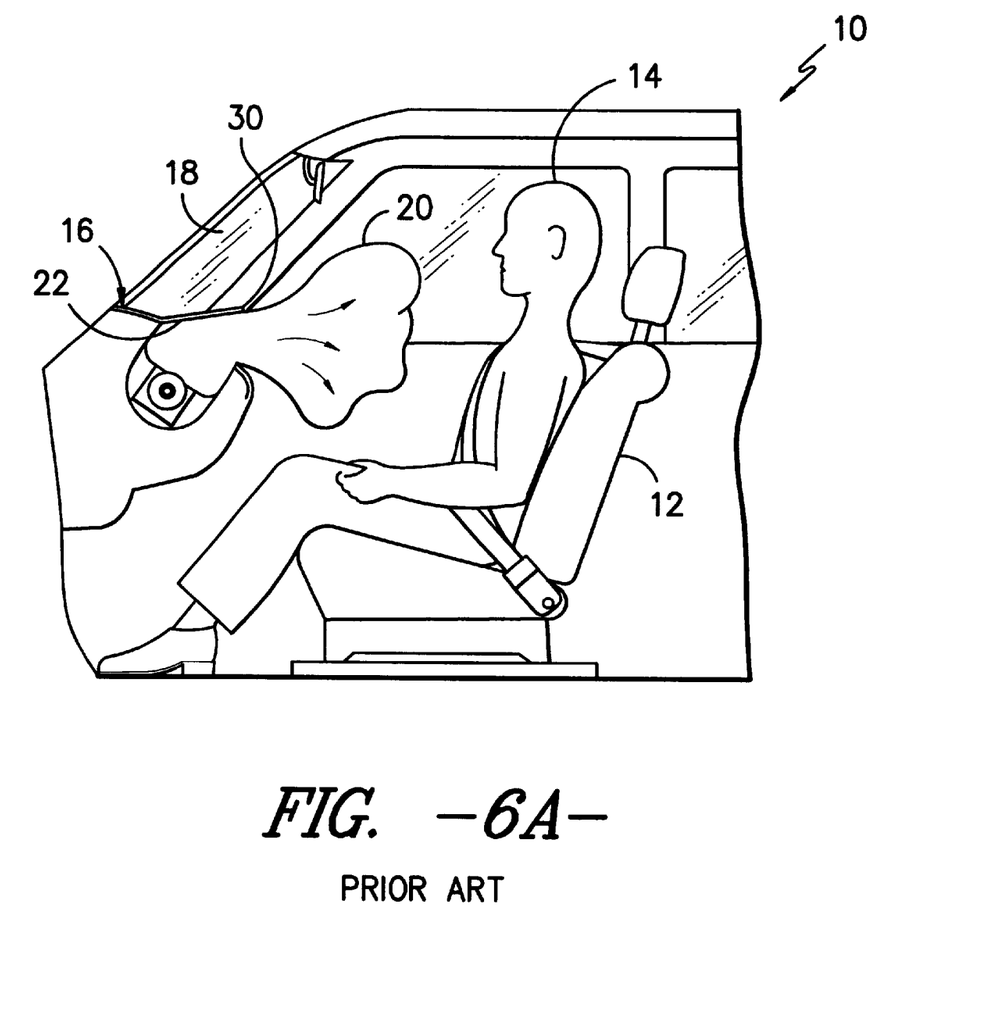
FIG. 6A illustrates the operative deployment of an air bag cushion incorporating a door structure according to the prior art.

The hinging action of a prior art door panel 22 is illustrated in FIG. 3. As illustrated, the rear edge 30 which projects towards the occupant to be protected is broken away from the adjacent substrate 24 and is hinged upwardly towards the windshield about an axis at the forward edge 32. During this hinging rotation, the interior of the door panel 22 remains substantially unaltered from it's predeployment configuration. This action of deployment is illustrated in FIG. 6A. As will be appreciated, during such deployment the rear edge 30 of the door panel 22 may move towards the occupant 14 as it progresses through the arc of rotation. Thus, an occupant seated in exceedingly close relation to the dash panel 16 may interfere with this rotation.

Figure 4A:
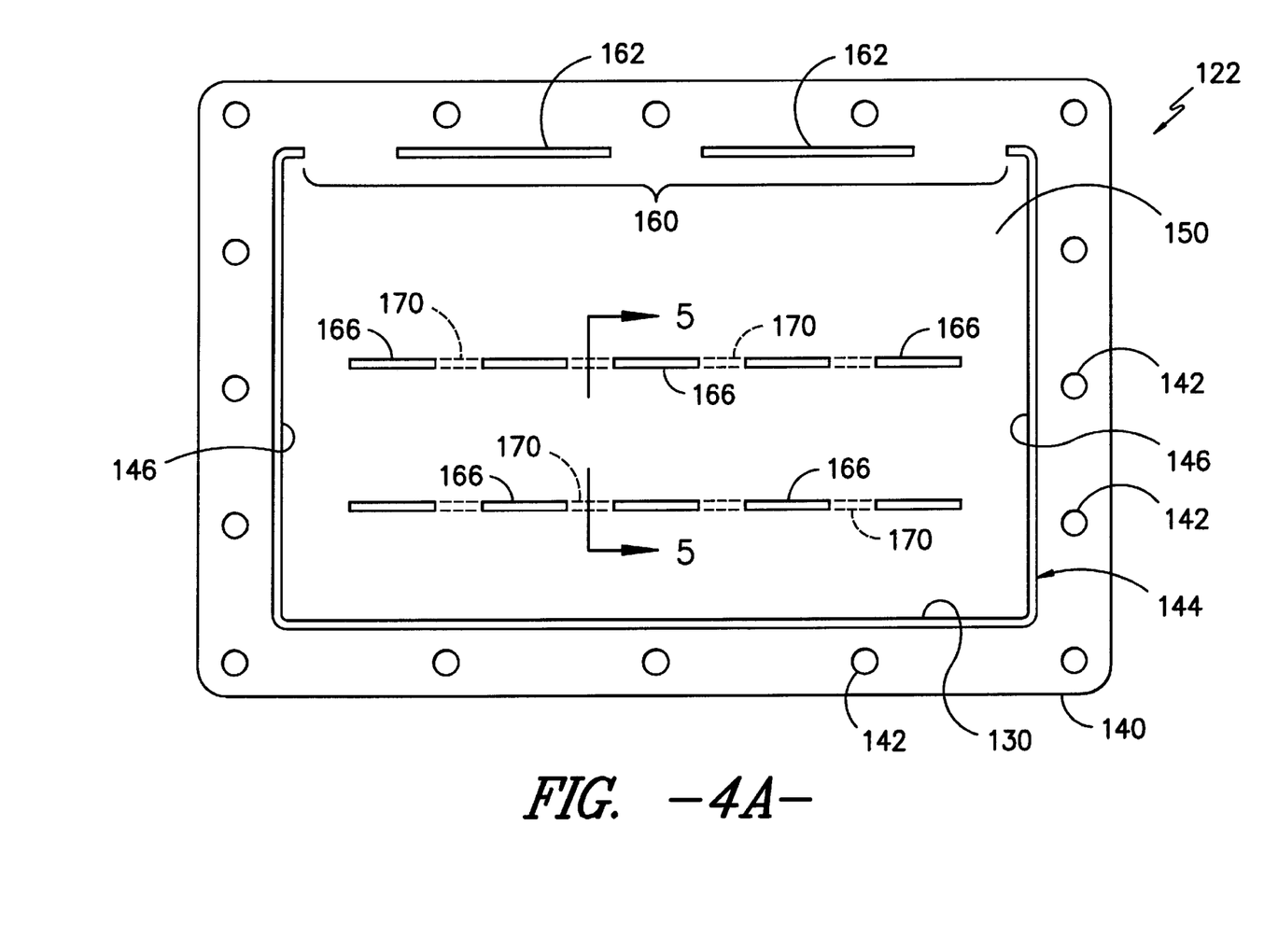
FIG. 4A is a plan view of a substrate panel including an internal hinging door with a pattern of integral hinging elements arranged across the door.
Figure 6B:
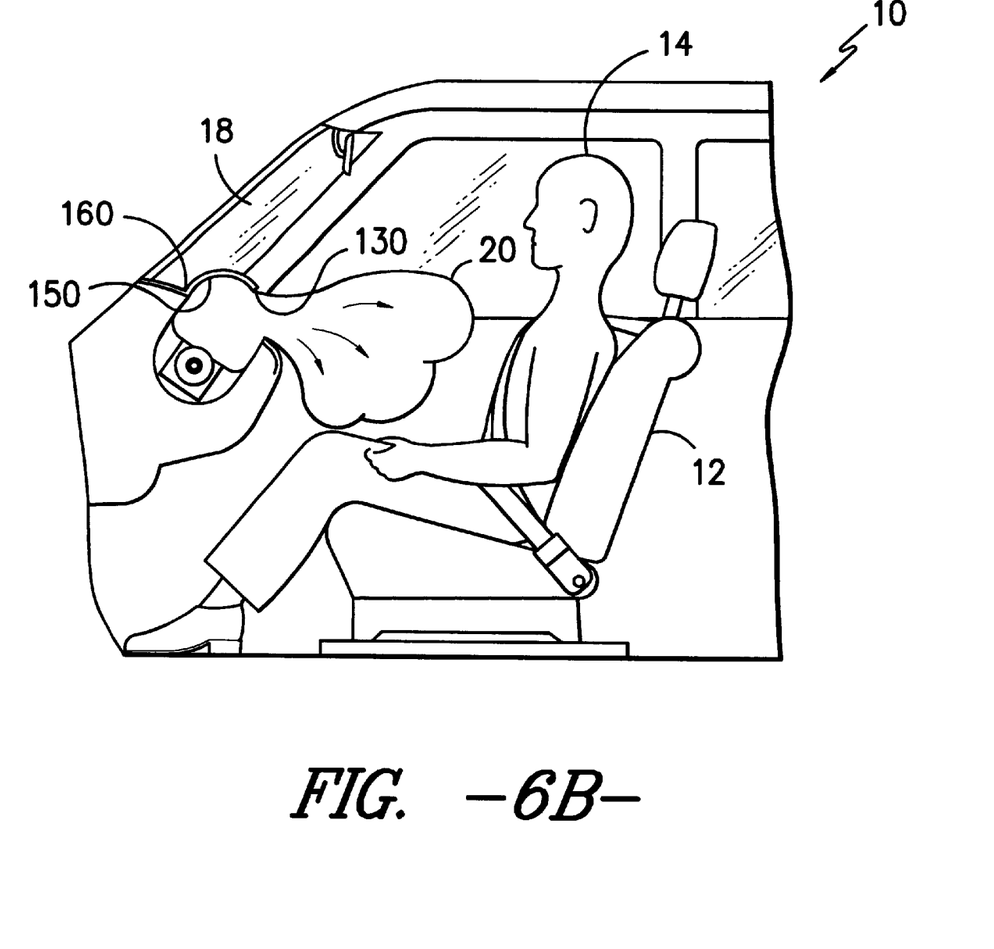
FIG. 6B illustrates deployment of an air bag cushion utilizing a door structure having integral tuned deformation.

An exemplary door panel assembly 122 according to the present invention which is capable of undergoing controlled internal deformation during the deployment process as pressure is applied by an underlying inflating air bag cushion is illustrated in FIG. 4A. As discussed further hereinafter, it has been found that a cover assembly incorporating such a door construction does not extend so substantially towards the occupant 14 during the deployment and thus provides a greater degree of freedom in design of the dash panel while reducing the likelihood of interference between the occupant and the cover assembly during deployment. This deployment character is illustrated in FIG. 6B.

As illustrated in FIG. 4A, the door panel assembly 122 includes a perimeter frame portion 140 including a plurality of attachment openings 142 for use in attachment to surrounding portions of the dash panel substrate using attachment elements such as screws or snap-in elements as will be well known to those of skill in the art. Disposed inboard of the perimeter frame portion 140 is a patterned break-out channel 144 which extends generally along the rear edge 130 (projecting towards the occupant to be protected) and along lateral sides 146 of a hinging door element 150. The break-out channel 144 is illustrated as a substantially continuous gap-forming opening extending between the hinging door element 150 and the perimeter frame 140. However, it is also contemplated that a number of other arrangements may likewise be utilized including by way of example only, discontinuous slotted segments forming a perforating arrangement as well as a patterned zone of reduced thickness which fails by fracture upon the application of pressure.

According to the illustrated embodiment, the hinging door element 150 is rotatable around a forwardly disposed living hinge portion 160 located in substantially opposing relation to the rear edge 130. In the exemplary configuration illustrated, the living hinge portion 160 is formed by an arrangement of discontinuous elongate channel openings 162 extending through the door panel assembly 122 along the forward edge of the hinging door element 150. The distance between the elongate channel openings 162 is preferably short enough to facilitate the bending of the material forming the hinging door element along the forward edge without giving rise to a fracture in such material thereby permitting the controlled rotation of the hinging door element 150 upwardly and away from the surrounding structure.

As illustrated, the interior of the hinging door element 150 may include an arrangement of openings 166 extending through the hinging door element between which hinge-forming segments of material 170 remain.

Surprisingly, it has been found that the introduction of such hinge-forming segments 170 within the interior of the hinging door element 150 may provide substantial benefit in the deployment characteristics of the hinging door element. In particular, it has been found that the deformable character of the hinging door element 150 reduces the space requirement for the movement of the door element by causing the door element 150 to assume a generally concave configuration relative to the air bag cushion 20 upon the application of pressure. The assumption of such a configuration reduces the extension of the hinging door element 150 towards the occupant 14 during displacement due to the fact that the rear edge 130 is pulled towards the windshield (FIG. 6B).

In addition to reducing the space requirements for hinging rotation, it is believed that the assumption of such enhanced concavity in the hinging door element 150 may also facilitate the initial downward deployment of the air bag cushion 20 towards the chest and torso of the occupant as well as around the lower portion of the dash panel 16 during the early stages of the collision event as illustrated in FIG. 6B.

As will be appreciated, such early downward deployment may be beneficial in some situations.

It is contemplated that the deformation of the hinging door element 150 may be substantially controlled by the adjustment of the number, spacing and arrangement of the interior openings 166 and the hinge forming segments 170 therebetween. Thus, while an illustrative embodiment has been shown incorporating two substantially parallel rows of interior openings having a generally elongate configuration, it is likewise contemplated that any number of alternative arrangements of such openings may be likewise utilized. In particular, in the event that substantial concavity and flexibility in the hinging door element 150 is desired it is contemplated that a large number of rows of closely spaced interior openings 166 may be utilized between the rear edge 130 and the living hinge portion 160. Conversely, in the event that only modest deformation is desired, a smaller number of more widely spaced interior openings may be utilized. Accordingly, the deployment character of the hinging door element 150 may be substantially tuned during design to achieve a desired deployment character thereby aiding in the freedom of design for the overall dash panel structure.

Figure 4B:
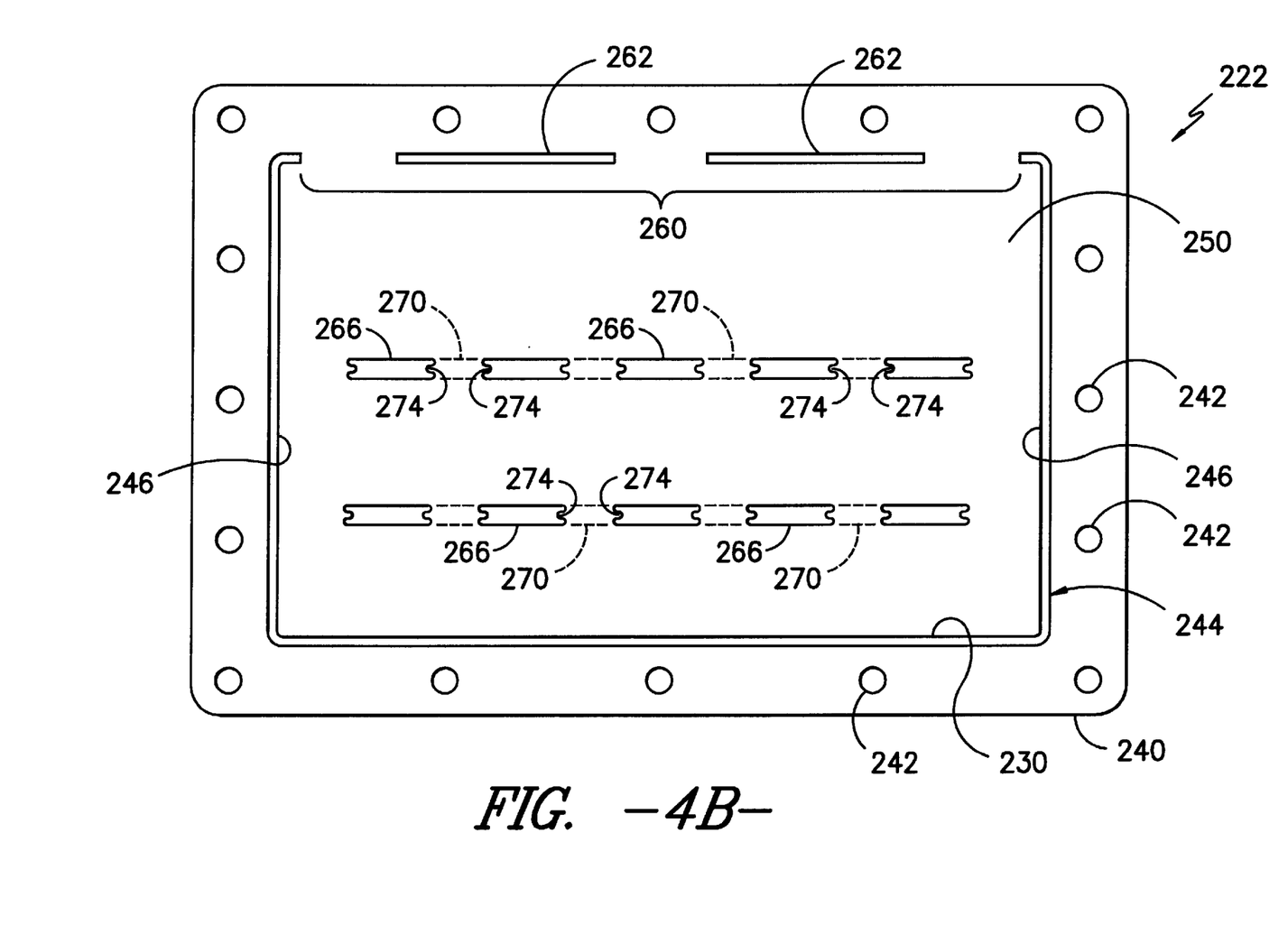
FIG. 4B is a view similar to FIG. 4A illustrating another exemplary configuration of hinging elements disposed across the interior of the door.

As indicated, aside from the elongate slotted geometry of the interior openings illustrated in FIG. 4A, it is also contemplated that any number of other geometries may also be utilized. By way of example only, and not limitation, an alternative geometry for interior openings 266 is illustrated in FIG. 4B wherein like elements to those previously described are designated by like reference numerals preceded by 200. As illustrated, in this arrangement the interior openings 266 have a generally compressed hourglass geometry. This geometry results in the hinge-forming segments 270 between the interior openings 266 to assume a geometry incorporating laterally projecting rounded nose portions 274. The diminishing width of the nose portions 274 in mating relation with the adjacent interior openings may in some instances aid in establishing the desired bending relationship.

Figure 4C:
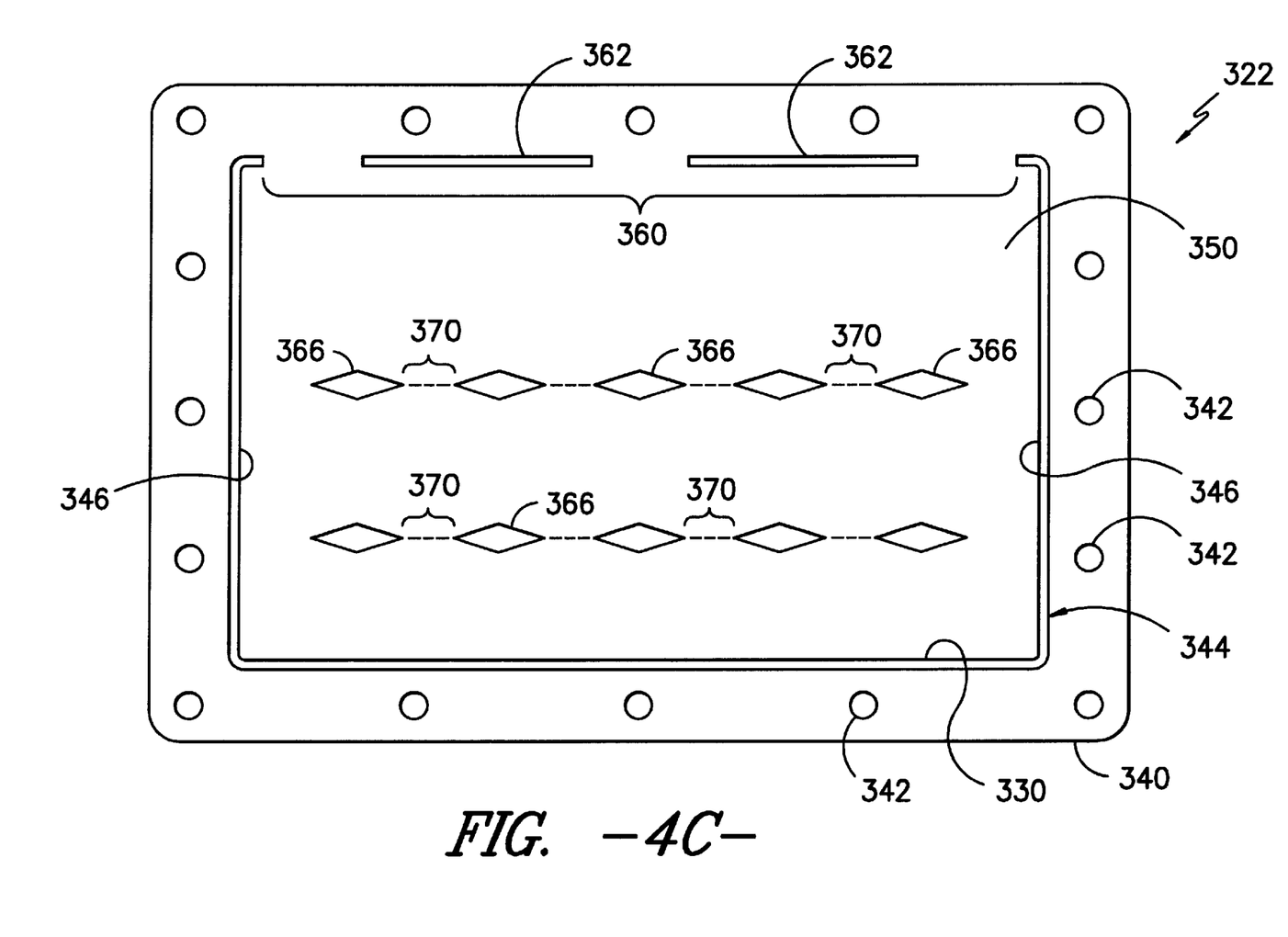
FIG. 4C is a view similar to FIGS. 4A and 4B illustrating yet another potential configuration of hinging elements disposed across the interior of the door.

In FIG. 4C, there is illustrated still another exemplary arrangement for a door panel assembly 322 wherein elements corresponding to those previously described are designated by like reference numerals preceded by 300. In this arrangement, the interior openings 366 are of a substantially flattened diamond shape thereby leading to the establishment of generally elongate linear hinge-forming segments 370 which are able to bend around a sharp radius due to the opposing lateral points of the adjacent openings 366. It is contemplated that such an arrangement may be particularly useful when using materials of construction having substantial ductility.

The embodiments in FIGS. 4A–4C wherein hinge forming segments are established between interior openings may be utilized in hinge door elements formed from any suitable material. Plastic or ductile metal such as thin gauge steel, aluminum or the like may be particularly useful.

In the event that enhanced internal hinging character is desired, it is contemplated that the hinge forming segments between the interior openings may be molded across the door in the depth dimension to facilitate the hinging action. Accordingly, in FIGS. 5A–5D there are illustrated several potential molded-in hinge forming configurations as may be utilized. For convenience of reference, these views are taken in cross-section through the hinging door element 150 along line 5—5 in FIG. 4A. However, it is to be appreciated that such molded in hinge-forming constructions may likewise be utilized in any hinging door element.

As illustrated, the molded-in hinge forming arrangement is formed by altering the thickness of the hinging door element 150 at the location of desired hinging action. In the exemplary arrangement in FIG. 5A, the molded-in hinge forming arrangement is made up of complimentary pairs of angled depressions 174, 176 projecting towards one another at locations where hinging action is desired.

Figure 5A:
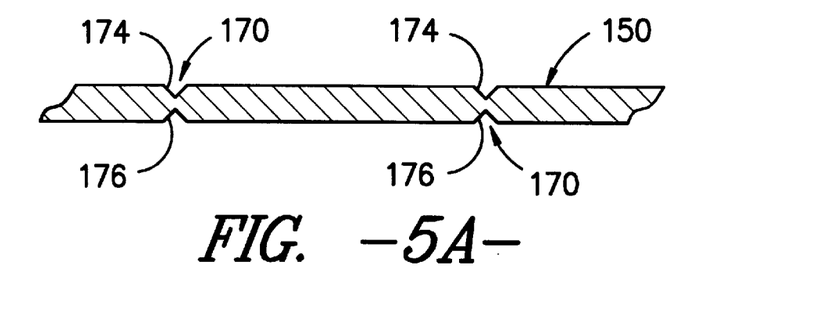
FIGS. 5A–5D are cross-sectional views taken through the door illustrating several exemplary molded-in hinge configurations.
Figure 5B:
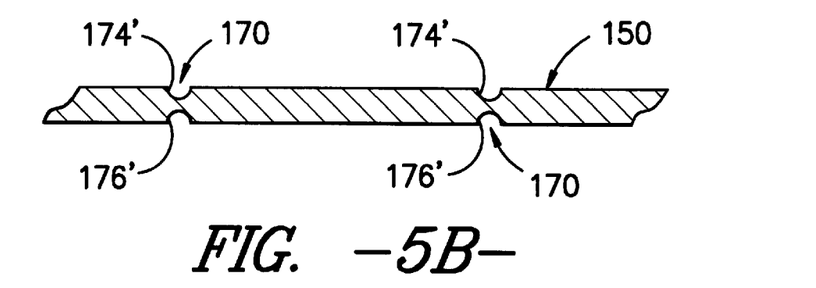

In FIG. 5B another molded-in hinge forming arrangement is illustrated. As shown, the arrangement in FIG. 5B is similar to that illustrated in FIG. 5A although the depressions 174', 176' are of substantially rounded profile which may aid in the reduction of stress concentration in some instances.

Figure 5C:
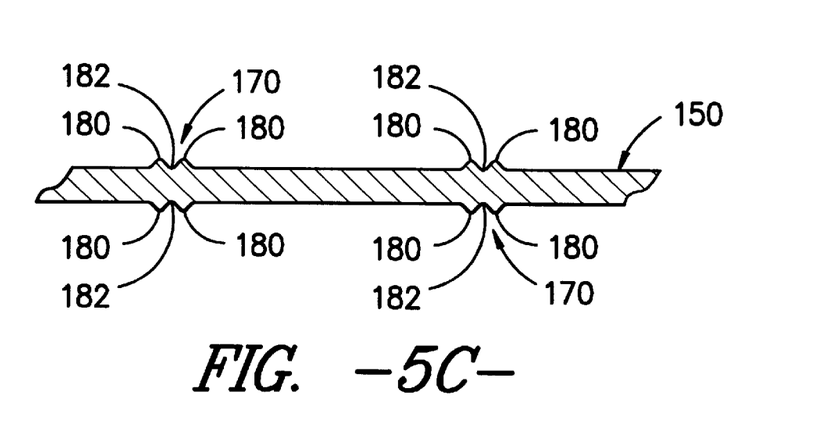

In FIG. 5C yet another hinge forming arrangement is illustrated. In the arrangement of FIG. 5C the hinge forming segments 170 are in the form of a pair of raised peaks 180 with a depression 182 disposed between the peaks 180. These hinge forming segments 170 are arranged on opposing sides of the hinging door element in substantially mirror image relation to one another.

Figure 5D:
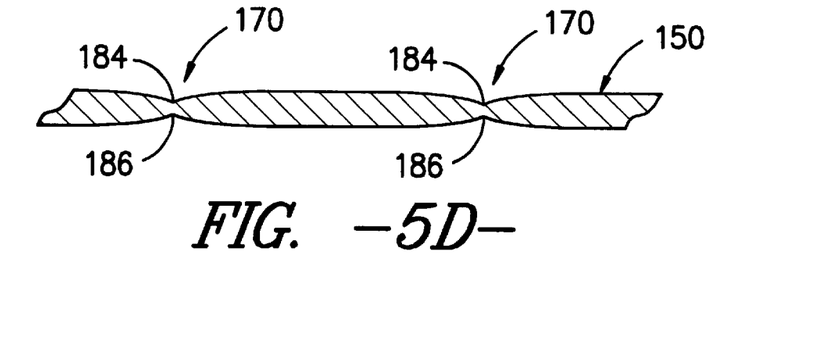

In FIG. 5D, there is illustrated yet another arrangement of molded-in hinge forming segments. In the arrangement of FIG. 5D, the opposing surfaces of the hinging door element 150 are molded in the form of opposing complimentary cusps 184, 186.

While each of the illustrated exemplary configurations for the molded-in hinge forming segments utilize opposing pairs of geometrically similar structures across both sides of the hinging door element 150, it is to be understood that any number of other arrangements may likewise be utilized. By way of example only, and not limitation, it is contemplated that any of the molded-in hinge forming segments may be disposed across only one side of the hinging door element 150. It is likewise contemplated that molded-in hinge forming segments of differing geometry may be disposed across one or both sides of the hinging door element 150 as may be desired to impart controlled deformation characteristics.

As will be appreciated, the introduction of molded-in hinge forming segments such as those illustrated in FIGS. 5A–5D may be particularly useful when the hinging door element is formed from a readily moldable material such as a plastic or the like which may be formed using procedures such as injection molding and the like. Of course such molded in hinge forming elements may also be introduced into metal door structures during casting or by subsequent forming operations such as machining or stamping.

It is contemplated that the introduction of molded-in hinge forming arrangements may substantially enhance the deformation capability of the hinging door element 150. In this regard, it is contemplated that the introduction of such molded-in elements may permit the complete elimination of interior openings across the hinging door element 150. Thus, the present invention contemplates hinging door elements which utilize molded-in hinge forming elements either alone or in combination with interior openings across the hinging door element as well as hinging door elements which incorporate interior openings with no additional molded-in hinge forming elements.

From the foregoing it may be seen that the present invention permits a designer to substantially control the deployment character of an air bag cover assembly in a predefined manner by the selected introduction of various internal hinge-forming elements. Thus, an additional degree of freedom is provided in the design of the automotive interior.

While the present invention has been illustrated and described in relation to certain potentially preferred embodiments and practices, it is to be understood that such embodiments and practices are illustrative and exemplary only and that the present invention is in no event to be limited thereto. Rather, it is contemplated that modifications and variations to the present invention will no doubt occur to those of skill in the art upon reading the above description and/or through a practice of the invention. It is therefore contemplated and intended with the present invention shall extend to all such modifications and variations which incorporate the broad principles of the present invention within the full spirit and scope thereof.

What is claimed is:

1. An air bag cover assembly for disposition within an automotive vehicle dash panel in overlying relation to an inflatable air bag cushion, the cover assembly comprising:
    a door structure including a displaceable edge and a displaceable interior portion disposed between the displaceable edge and a hingedly attached edge wherein the interior portion comprises a plurality of integral hinging elements disposed in a patterned arrangement across selected localized segments of the interior portion to define a plurality of spaced hinge lines located at different distances from the displaceable edge between the displaceable edge and the hingedly attached edge so as to enhance internal flexibility of the interior portion at said plurality of hinge lines such that upon inflation of the air bag cushion the interior portion is displaceable in a hinging manner around the hingedly attached edge relative to the dash panel while concurrently undergoing preferential internal deformation at the integral hinging elements along said plurality of hinge lines to assume a substantially concave relation to the air bag cushion.

2. The assembly as recited in claim 1, wherein the door structure is formed from metal.

3. The assembly as recited in claim 1, wherein the door structure is formed from plastic.

4. The assembly as recited in claim 1, wherein the door structure further comprises a plurality of substantially discrete openings extending in spaced relation across the interior portion such that spaces between the openings define at least a portion of the integral hinging elements.

5. The assembly as recited in claim 4, wherein at least a portion of the openings are of elongate slotted geometry.

6. The assembly as recited in claim 4, wherein at least a portion of the openings are of substantially diamond shaped geometry.

7. The assembly as recited in claim 4, wherein at least a portion of the openings are of substantially compressed hourglass geometry.

8. The assembly as recited in claim 1, wherein at least a portion of the integral hinging elements comprise localized segments of varying thickness dimension molded into the interior portion.

9. The assembly as recited in claim 8, wherein at least a portion of said localized segments of varying thickness dimension comprise thickness reducing depressions disposed across the interior portion.

10. The assembly as recited in claim 9, wherein said thickness reducing depressions are substantially angular extending to a pointed apex.

11. The assembly as recited in claim 9, wherein said thickness reducing depressions are substantially cusp shaped.

12. The assembly as recited in claim 9, wherein said thickness reducing depressions have a substantially curved profile.

13. The assembly as recited in claim 8, wherein at least a portion of said localized segments of varying thickness dimension comprise pairs of peaks extending in raised relation to at least one surface of the interior portion of the door structure and wherein the peaks within the pairs are separated by a depression such that the peaks and depression form a hinge of substantially saddle shaped profile.

14. An air bag cover assembly for disposition within an automotive vehicle dash panel in overlying relation to an inflatable air bag cushion, the cover assembly comprising;
    a door structure comprising a displaceable edge and a displaceable interior portion disposed between the displaceable edge and a hingedly attached edge wherein the interior portion comprises a plurality of openings disposed in a patterned arrangement across selected localized segments of the interior portion at different distances from the displaceable edge such that spaces between the openings define a plurality of integral hinging zones located at different distances from the displaceable edge between the displaceable edge and the hingedly attached edge so as to enhance internal flexibility of the interior portion at said plurality of hinging zones at which preferential localized deformation of the interior portion takes place upon the application of force and such that upon application of force by the air bag cushion the interior portion is displaceable in a hinging manner relative to the dash panel while concurrently undergoing internal deformation to assume a substantially concave relation to the air bag cushion.

15. The assembly as recited in claim 14, wherein the door structure is formed from metal.

16. The assembly as recited in claim 14, wherein the door structure is formed from plastic.

17. The assembly as recited in claim 14, wherein at least a portion of the openings are of elongate slotted geometry.

18. The assembly as recited in claim 14, wherein at least a portion of the openings are of substantially diamond shaped geometry.

19. The assembly as recited in claim 14, wherein at least a portion of the openings are of substantially compressed hourglass geometry.

20. An air bag cover assembly for disposition within an automotive vehicle dash panel in overlying relation to an inflatable air bag cushion, the cover assembly comprising:
    a door structure comprising a displaceable interior portion wherein the interior portion comprises a plurality of openings disposed in a patterned arrangement across the interior portion such that spaces between the openings define integral hinging zones at which preferential localized deformation of the interior portion takes place upon the application of force and such that upon application of force by the air bag cushion the interior portion is displaceable in a hinging manner relative to the dash panel while concurrently undergoing internal deformation to assume a substantially concave relation to the air bag cushion, wherein at least a portion of the integral hinging zones comprise localized segments of varying thickness dimension molded into the interior portion.

21. The assembly as recited in claim 20, wherein at least a portion of said localized segments of varying thickness dimension comprise thickness reducing depressions disposed across the interior portion.

22. The assembly as recited in claim 21, wherein said thickness reducing depressions are substantially angular extending to a pointed apex.

23. The assembly as recited in claim 21, wherein said thickness reducing depressions are substantially cusp shaped.

24. The assembly as recited in claim 21, wherein said thickness reducing depressions have a substantially curved profile.

25. The assembly as recited in claim 20, wherein at least a portion of said localized segments of varying thickness dimension comprise pairs of peaks extending in raised relation to at least one surface of the interior portion of the door structure and wherein the peaks within the pairs are separated by a depression such that the peaks and depression form a hinge of substantially saddle shaped profile.

* * * * *